(No Model.)
J. A. JOHNSON.
CORN SCOOP.
No. 388,687. Patented Aug. 28, 1888.
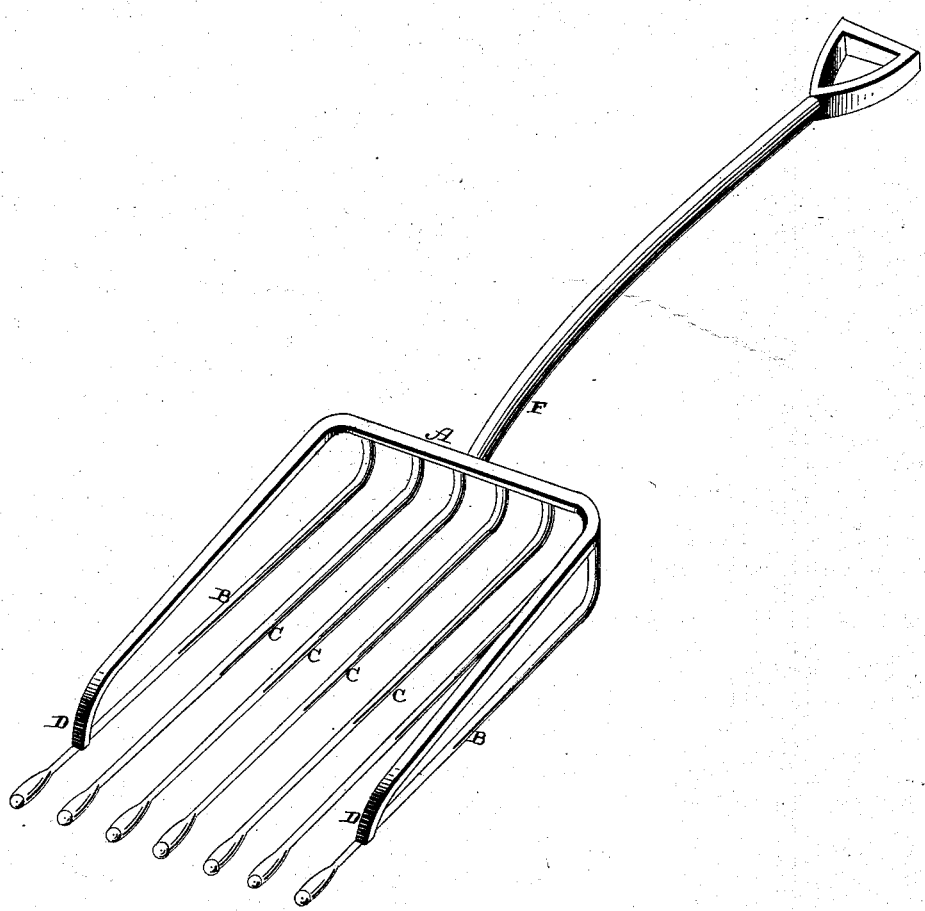

UNITED STATES PATENT OFFICE.

JOHN ALBERT JOHNSON, OF UNION COUNTY, MISSISSIPPI.

CORN-SCOOP.

SPECIFICATION forming part of Letters Patent No. 388,687, dated August 28, 1888.

Application filed April 24, 1888. Serial No. 271,704. (No model.)

*To all whom it may concern:*

Be it known that I, JOHN ALBERT JOHNSON, of Union county, in the State of Mississippi, have invented certain new and useful Improvements in Corn-Scoops; and I do hereby declare the following to be a full, clear, and exact description of the invention, such as will enable others skilled in the art to which it pertains to make and use it, reference being had to the accompanying drawing, which forms part of this specification.

My invention relates to an improvement in scoops; and it consists in the combination of the body, having its ends turned down, with the bent tines which are secured to the body, all of which will be more fully described hereinafter.

The object of my invention is to provide a scoop which is especially adapted for shoveling corn and other such substances, and which will take up a larger amount than can possibly be done with shovels or forks of the ordinary construction.

The accompanying drawing represents a perspective of a scoop which embodies my invention.

A represents the body of the scoop; B the two outside tines, and C the central ones. The body A is curved, as shown, and has its forward ends, D, curved downward and fastened to the two outside tines near their front ends, as shown. The central portion of this body where the handle F is secured to it is thickest and heaviest, and from this portion it tapers toward its two ends, as shown. All the tines are curved upward at their rear ends and have these ends secured to the thickest and heaviest portion of the body, as shown. These tines are not connected together at any point, but extend out-
ward from their rear to their front ends unobstructed, so as not to catch against or interfere with the ears of corn as the scoop is being forced through them. Upon the outer end of each tine is a ball or enlargement, G, so as to prevent the end of the tines from sticking into the ears of corn, as they otherwise would do. Where the points of the tines are sharp they catch in the ears to such an extent as to greatly impede the workman, but not where the ends are enlarged, as here shown. The front portions of the body or frame A serve as arms or guides to prevent the ears of corn from dropping over the edges of the scoop.

The scoop constructed as here shown and described is adapted especially for handling corn in the ear, and will take up a larger amount and with more ease to the operator than can possibly be done with a scoop or fork of the ordinary construction, and is light, cheap, and durable.

Having thus described my invention, I claim—

The combination of the body A, made heaviest at its center and lightest at its front ends, and having its front ends, D, curved downward and secured to the two outer tines, with the tines C, provided with the balls G upon their outer ends, and which have their rear ends curved upward and secured to the central portion of the body, and the handle F, substantially as shown.

In testimony whereof I affix my signature in presence of two witnesses.

JOHN ALBERT JOHNSON.

Witnesses:
H. MARSHALL,
A. J. MARTIN.